(12) United States Patent
Iyer

(10) Patent No.: US 10,749,465 B2
(45) Date of Patent: Aug. 18, 2020

(54) SOLAR ENERGY COLLECTION PANEL CLEANING SYSTEM

(71) Applicant: Jagadish Iyer, Berkeley Heights, NJ (US)

(72) Inventor: Jagadish Iyer, Berkeley Heights, NJ (US)

(*) Notice: Subject to any disclaimer, the term of this patent is extended or adjusted under 35 U.S.C. 154(b) by 81 days.

(21) Appl. No.: 15/579,905

(22) PCT Filed: Jun. 3, 2016

(86) PCT No.: PCT/US2016/035852
§ 371 (c)(1),
(2) Date: Dec. 5, 2017

(87) PCT Pub. No.: WO2016/197013
PCT Pub. Date: Aug. 12, 2016

(65) Prior Publication Data
US 2018/0175786 A1    Jun. 21, 2018

Related U.S. Application Data

(63) Continuation of application No. 62/171,817, filed on Jun. 5, 2015.

(51) Int. Cl.
H02S 40/12 (2014.01)
F24S 40/20 (2018.01)
H02S 40/22 (2014.01)

(52) U.S. Cl.
CPC .............. *H02S 40/12* (2014.12); *F24S 40/20* (2018.05); *H02S 40/22* (2014.12); *Y02E 10/40* (2013.01)

(58) Field of Classification Search
CPC ................................. H02S 40/10; F24S 40/20
See application file for complete search history.

(56) References Cited

U.S. PATENT DOCUMENTS 4,331,295 A  *  5/1982  Warihashi ................ B05B 1/10
                                                        239/284.1
8,240,320 B2     8/2012  Mertins et al.
(Continued)

FOREIGN PATENT DOCUMENTS

CN      202361675 U      8/2012
CN      202555556 U     11/2012
(Continued)

OTHER PUBLICATIONS

International Search Report and Written Opinion in International Application No. PCT/US2016/035852, dated Sep. 8, 2016.
(Continued)

*Primary Examiner* — Joseph L. Perrin
*Assistant Examiner* — Irina Graf
(74) *Attorney, Agent, or Firm* — Nixon Peabody LLP; Jeffrey L. Costellia

(57) ABSTRACT

An apparatus, method and system for cleaning a solar panel includes a solar panel, one or more fluid reservoirs, a fluid dispenser at a first side of a solar panel, a mechanism for providing pressurized fluid to the fluid dispenser from the fluid reservoir(s), and a mechanism for dispensing the fluid from the dispenser. The solar panel is periodically cleaned and the motivation for cleaning may be a detected output condition of the panel, a detected weather condition, an expired time condition, detected precipitant accumulation, a manual command, or the like. The fluid(s) may include a gas and/or one or more liquids. A heater may be provided to heat the fluid(s).

20 Claims, 7 Drawing Sheets

(56) References Cited

U.S. PATENT DOCUMENTS

| | | |
|---|---|---|
| 8,323,421 B2 | 12/2012 | Lee |
| 8,360,050 B1 | 1/2013 | Albritton |
| 9,016,292 B1 | 4/2015 | Schneider et al. |
| 9,130,502 B1 | 9/2015 | Aly et al. |
| 9,192,966 B2 | 11/2015 | Zanatta |
| 2001/0035467 A1* | 11/2001 | Ebberts .................. A47L 11/34 239/413 |
| 2007/0227574 A1* | 10/2007 | Cart ........................ H02S 20/00 136/206 |
| 2007/0240278 A1 | 10/2007 | MacDonald |
| 2009/0223510 A1 | 9/2009 | Larsen |
| 2009/0288679 A1 | 11/2009 | Pietsch et al. |
| 2009/0288691 A1 | 11/2009 | Hunt et al. |
| 2010/0043851 A1 | 2/2010 | Levy et al. |
| 2010/0236608 A1 | 9/2010 | Ball et al. |
| 2011/0056924 A1 | 3/2011 | Townsend |
| 2011/0094542 A1* | 4/2011 | Gonzalez Rodriguez ................... B08B 1/00 134/37 |
| 2011/0197943 A1 | 8/2011 | Pleva et al. |
| 2012/0120641 A1 | 5/2012 | Yassa |
| 2012/0138123 A1* | 6/2012 | Newdoll ................. H02J 3/383 136/246 |
| 2013/0240004 A1 | 9/2013 | Ho |
| 2013/0255665 A1 | 10/2013 | Nickel |
| 2013/0306136 A1 | 11/2013 | Hendrickson, Jr. |
| 2013/0337226 A1 | 12/2013 | Curran et al. |
| 2015/0001201 A1 | 1/2015 | Adler et al. |
| 2015/0021310 A1 | 1/2015 | Van Straten |
| 2015/0306636 A1 | 10/2015 | Nagura et al. |
| 2015/0311859 A1 | 10/2015 | Hamdi |
| 2017/0173640 A1* | 6/2017 | Grossman ............... H02S 40/10 |

FOREIGN PATENT DOCUMENTS

| | | |
|---|---|---|
| WO | 2011/004411 A2 | 1/2011 |
| WO | 2011/141892 A2 | 11/2011 |
| WO | 2012/032107 A2 | 3/2012 |
| WO | 2015/083149 A1 | 6/2015 |

OTHER PUBLICATIONS

International Preliminary Report on Patentability in International Application No. PCT/US2016/035852, dated Dec. 14, 2017.

Bitimec, "Bitimec's New Solar Panel Washing Machine Cleans Solar Panels Fast", retrieved on May 9, 2016 from http://www.bitimec.com/bitimec_page.asp?IDProdotto=315.

Bullis, Kevin, "Self-Cleaning Solar Panels", MIT Technology Review, Aug. 26, 2010, retrieved on May 9, 2016 from https://www.technologyreview.com/s/420524/self-cleaning-solar-panels/.

Heliotex, "Automatic Solar Panel Cleaning Systems", retrieved on May 9, 2016 from https://www.solarpanelcleaningsystems.com/.

IPC Eagle, "Hydro Station", retrieved on May 9, 2016 from http://www.ipceagle.com/products/solar-panel-pure-water-cleaning-system#.VzC4itsrKJA.

Parish Maintenance Supply, "Solar Panel Cleaning", retrieved on May 9, 2016 from https://www.parish-supply.com/solar-panel-cleaning.aspx.

Pickerel, Kelly, "Fighting Dirty: Manual Washing vs. Automatic Cleaning of Solar Modules", Solar Power World, Feb. 25, 2015, retrieved on May 9, 2016 from https://www.solarpowerworldonline.com/2015/02/fighting-dirty-manual-washing-vs-automatic-cleaning-of-solar-modules/.

* cited by examiner

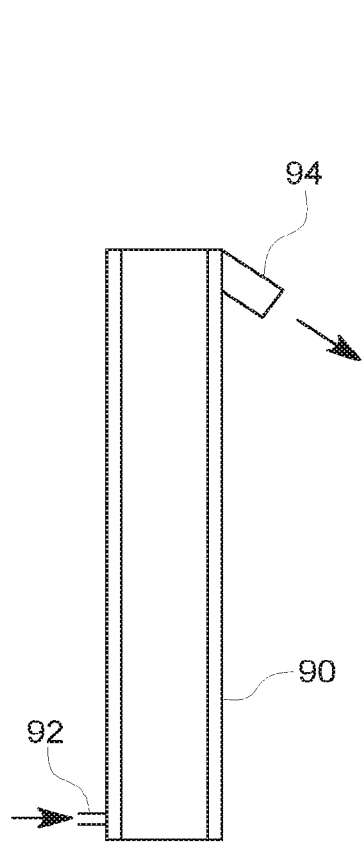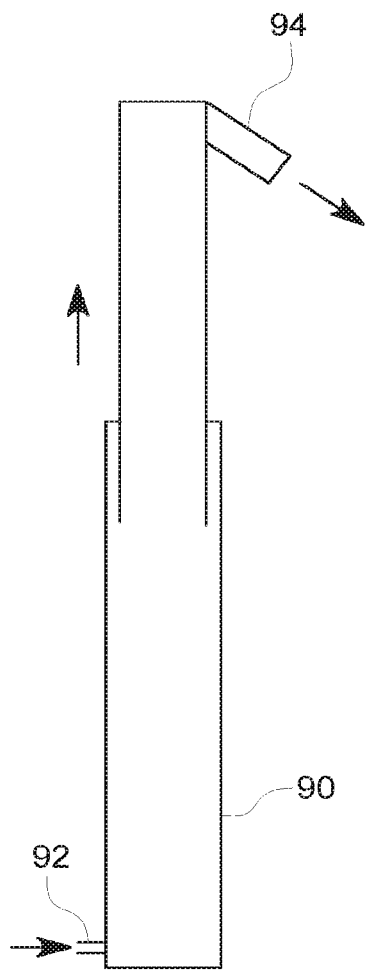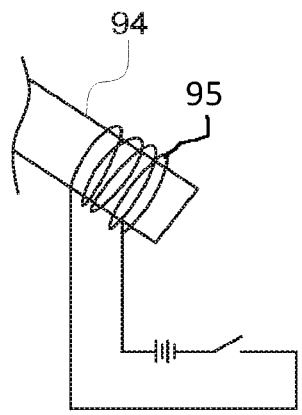

SOLAR ENERGY COLLECTION PANEL CLEANING SYSTEM

CROSS REFERENCE TO RELATED APPLICATIONS

This patent application is a United States National Stage Application filed under 35 U.S.C. § 371 of International Application No. PCT/US2016/035852, entitled "Solar Energy Collection Panel Cleaning System," which was filed on Jun. 3, 2016 which claims the benefit of, and priority to, U.S. Provisional Patent Application Ser. No. 62/171,817 filed on Jun. 5, 2015, the disclosure of which is hereby incorporated by reference in its entirety.

TECHNICAL FIELD

The present disclosure relates generally to a system, apparatus and method for cleaning solar energy collection panels such as reflective solar concentrator panels and photovoltaic panels.

BACKGROUND

The term "solar energy collection panel" (or "panel") as used herein is intended to include reflector-type panels (e.g., mirrors) used in heliostats as well as photovoltaic ("PV") panels which directly convert solar energy to electrical energy. Solar energy collection panels, or "solar panels", are generally deployed outdoors and are exposed to dirt, dust, sand, precipitation, and the like which tend, over time, to interfere with the transmission of solar energy to the panel and to reduce the efficiency of such panels. What is desired is a system and method for efficiently and inexpensively cleaning solar panels periodically to maintain their output.

OVERVIEW

An apparatus, method and system for cleaning a solar panel includes a solar panel, one or more fluid reservoirs, a fluid dispenser at a first side of a solar panel, a mechanism for providing pressurized fluid to the fluid dispenser from the fluid reservoir(s), and a mechanism for dispensing the fluid from the dispenser. The solar panel is periodically cleaned and the motivation for cleaning may be a detected output condition of the panel, a detected weather condition, an expired time condition, detected precipitant accumulation, a manual command, or the like. The fluid(s) may include a gas and/or one or more liquids, and in the case of liquid(s) a fluid collector may be provided at a second side of a solar panel and utilized to collect at least some of the fluid which may then be directed optionally to a filter and then optionally to an appropriate reservoir for reuse or disposal.

BRIEF DESCRIPTION OF THE DRAWINGS

The accompanying drawings, which are incorporated into and constitute a part of this specification, illustrate one or more exemplary embodiments and, together with the description of the exemplary embodiments, serve to explain the principles and implementations of the invention.

In the drawings:

FIG. 6A is a cross-sectional diagram illustrating an extendable fluid dispenser in a retracted state in accordance with various embodiments.

FIG. 6B is a cross-sectional diagram illustrating an extendable fluid dispenser in an extended state in accordance with various embodiments.

FIG. 6C is a detailed schematic diagram illustrating a coil-type electrical water heater disposed at the nozzle of a fluid dispenser in accordance with various embodiments.

DESCRIPTION OF EXAMPLE EMBODIMENTS

Figure 1:
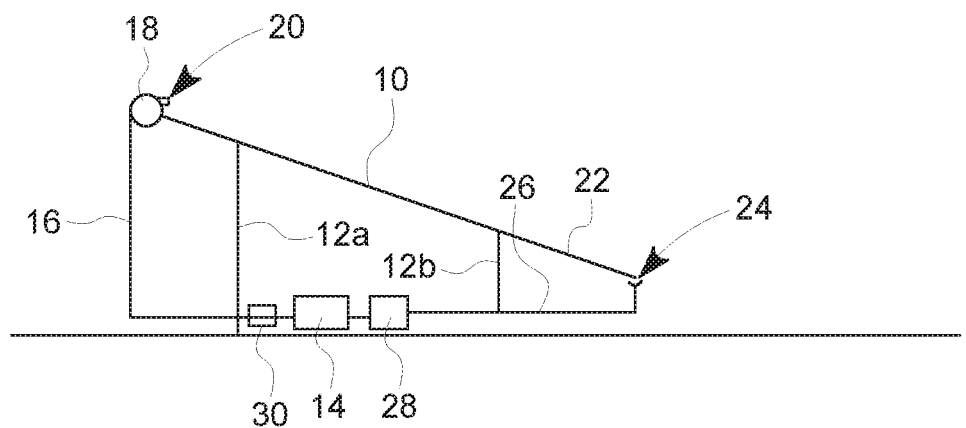
FIG. 1 is a schematic diagram of a solar panel in accordance with an aspect of the invention.

Exemplary embodiments are described herein in the context of a solar energy collection panel cleaning system. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the exemplary embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

References herein to "one embodiment" or "an embodiment" or "one implementation" or "an implementation" means that a particular feature, structure, part, function or characteristic described in connection with an exemplary embodiment can be included in at least one exemplary embodiment. The appearances of phrases such as "in one embodiment" or "in one implementation" in different places within this specification are not necessarily all referring to the same embodiment or implementation, nor are separate and alternative embodiments necessarily mutually exclusive of other embodiments.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

In accordance herewith a solar energy collection panel cleaning system comprises a combination of an apparatus, software controlling automated aspects of the apparatus and a method for cleaning fully assembled and installed solar energy collection panels (concentrator panels, reflector panels and photovoltaic panels) periodically or an adhoc basis whether deployed on a commercial rooftop, residential rooftop, or in a ground-mounted solar farm configuration to clean the panel surface thereby reducing loss caused by atmospherically deposited material such as dirt, dust, sand, precipitation and the like. The cleaning may be initiated in response to a detected output condition of the panel, a detected or expected future weather condition, an expired time condition, detected precipitant accumulation, a manual command, or the like.

A purpose of the invention is to restore surface integrity of the panel so that it can capture (or reflect) as much light as possible given that obstructions on the panel surface impact output and hence the economics of the energy being produced. The cleaning approaches described herein are applicable to all types of solar panels, e.g., crystalline semiconductor, thin film based (cadmium telluride, amorphous silicon, copper indium gallium diselenide or any other type), polycrystalline semiconductor, mirror, concentrator-type, fixed or tracked that is being deployed and can be customized according to the dimensions of the panel and its orientation (fixed or rotating by means of a solar tracker system).

While commercially available PV solar panels are commonly warranted for 20 or more years, the real challenge in terms of sustained output for users comes from a host of external factors, particularly the weather. Snow, ice, sleet, sand or dust particles present on the surface of the panel can adversely affect the net efficiency of the panel by obscuring, attenuating or deflecting sunlight to be captured/reflected. Since such obscuring, attenuating or deflecting adversely affects the economics of the panel, a practical approach to restoring the panel to its initial clean state is to use an automated system to monitor and clean the panel in an appropriate manner at an appropriate time. Since adjacent panels may have different contamination levels, in accordance with an aspect of the invention each panel or group of panels in an array may be provided with its own system for determining when to clean the panel or group of panels in the array.

The apparatus, systems and methods detailed herein are directed to cleaning solar panels manually or automatically so that more useable energy can be collected over time.

The disclosure describes (a) hardware which may be associated with the panel and may be customized for a particular installation in order to carry out the cleaning process; (b) various cleaning processes which may be implemented with the hardware; (c) sensor (and other) systems which may be utilized to make the decision to start the cleaning process; and (d) control systems for utilizing the sensor data to make the start decision and carry out the cleaning process. Optionally feedback systems (such as sensors or video) may be incorporated to determine when the cleaning process has completed its task or run into an impasse so as to make the cleaning process more efficient and alert a human (or robotic) operator to a problem which requires attention.

The hardware that adapts a solar panel for cleaning in accordance with an aspect of the present invention includes a weatherproof fixture deployed along at least a first edge (generally the upper-most edge) of a panel. The fixture comprises at least one manifold or a plurality of conduits such as pipes for carrying the cleaning fluid (liquid or gas) to the fixture. A plurality of nozzles or diffusers (collectively referred to as "nozzles") on the fixture, which may be placed at even spacings if desired, direct the fluid into contact with the upper surface of the panel for cleaning purposes.

In accordance with one aspect of the invention, a plurality of different fluids may be made available to the fixture using partially common or entirely separate conduits from separate fluid reservoirs in order to provide more than one cleaning mode for the panels. Separate nozzles may be employed for the different fluids if desired. For example, in accordance with an aspect of the invention, compressed air (gas), water, and ethylene glycol may be separately provided to clean the panel in response to a variety of conditions.

FIG. 1 is a schematic diagram of a solar panel 10 in accordance with an aspect of the invention. A solar panel 10 as shown in FIG. 1 is mounted to a platform comprising supports 12a, 12b. A fluid reservoir 14 may store a pressurized fluid such as a liquid or a gas for deployment via path 16 (which may be, for example, a pipe) to a dispenser 18 which may be a manifold or similar device with one or more nozzles 20 through which the fluid is emitted and directed against the upper surface 22 of panel 10. In one embodiment the fluid, if a liquid, may be collected by collector 24 which may be a trap, trough or similar device and which may be assisted by a vacuum device, or not, depending upon the application. Fluid collected by the collector is directed via path 26 (which may be, for example, a pipe) to filter 28 where dirt and other impurities are removed before the fluid is recycled back into reservoir 14.

The fluid may be a pressurized gas such as pressurized air or nitrogen or the like used to blow dirt from the upper surface 22 of panel 10. Similarly, it may be a liquid such as water, alcohol, ethylene glycol (EG), some combination thereof and/or a selectable choice of one or more of the above, or the like. Water may be used for a simple regular cleaning. EG may be used if accumulated snow or ice is expected or detected (using, for example, visual detectors, weather information (commonly available from a number of sources in electronic format), temperature sensors, other sensors or manual sensing). Where desirable the liquid may be recycled rather than deployed into the environment. Additionally, a heater 30 may be provided to warm the fluid prior to deployment to increase its cleaning efficiency where desired. Anti-siphon valves may be used to prevent backflow if required.

Figure 2:
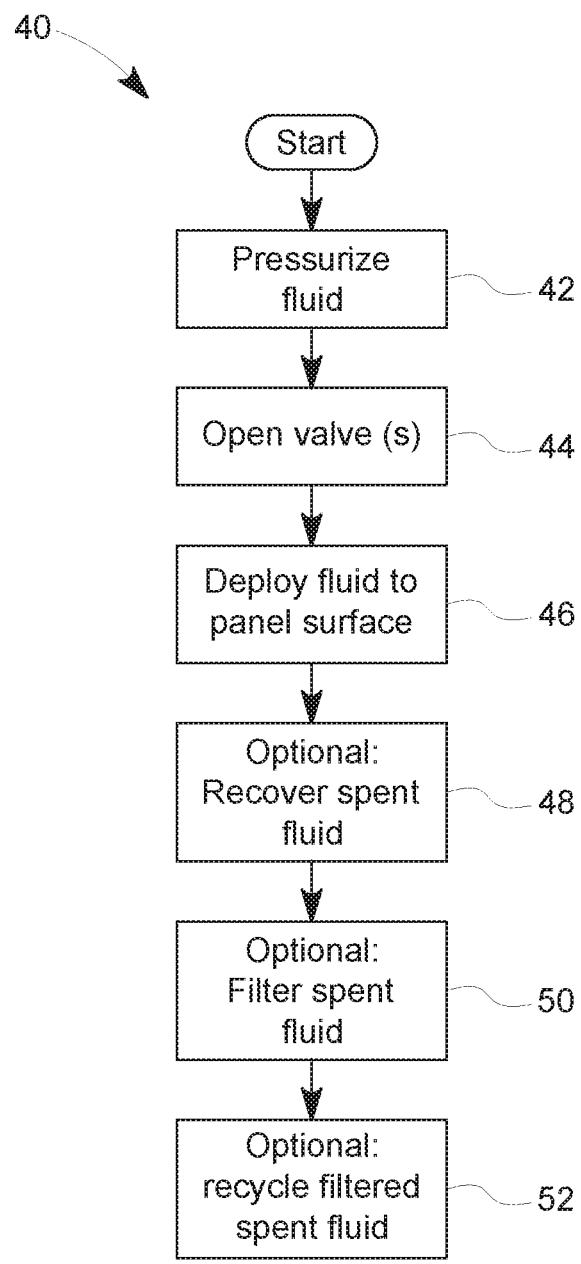
FIG. 2 is a process flow diagram for cleaning a solar panel in accordance with an aspect of the invention.

FIG. 2 is a process flow diagram illustrating an aspect of the invention. A conventional control system may implement the process 40 of FIG. 2. One or more reservoirs 14 containing a cleaning fluid (gas or liquid) are pressurized at step 42. When pressurized (as detected, for example, by a pressure sensor), valves deployed between the reservoirs and the dispenser 18 are opened 44 to allow the fluid to flow to the panel surface 46. Once the period for cleaning is over they are closed again. The period for cleaning may be a fixed period or based upon a calculation by the control system, or based upon feedback provided by one or more sensors deployed to monitor the solar panels. For example, where snow and ice is a concern a low-power laser could be targeted at an oblique angle to the surface of the panel and its reflection monitored. Only where there was a buildup of ice/snow would the reflection be detected above a certain threshold and this sensor could be used to detect snow/ice accumulation and could be used to operate the cleaning cycle until the snow/ice accumulation was dissipated. Optionally liquid fluid may be collected 48 at collectors 24, optionally filtered or otherwise cleaned 50 and optionally recycled for reuse to the respective reservoir 52.

Figure 3:
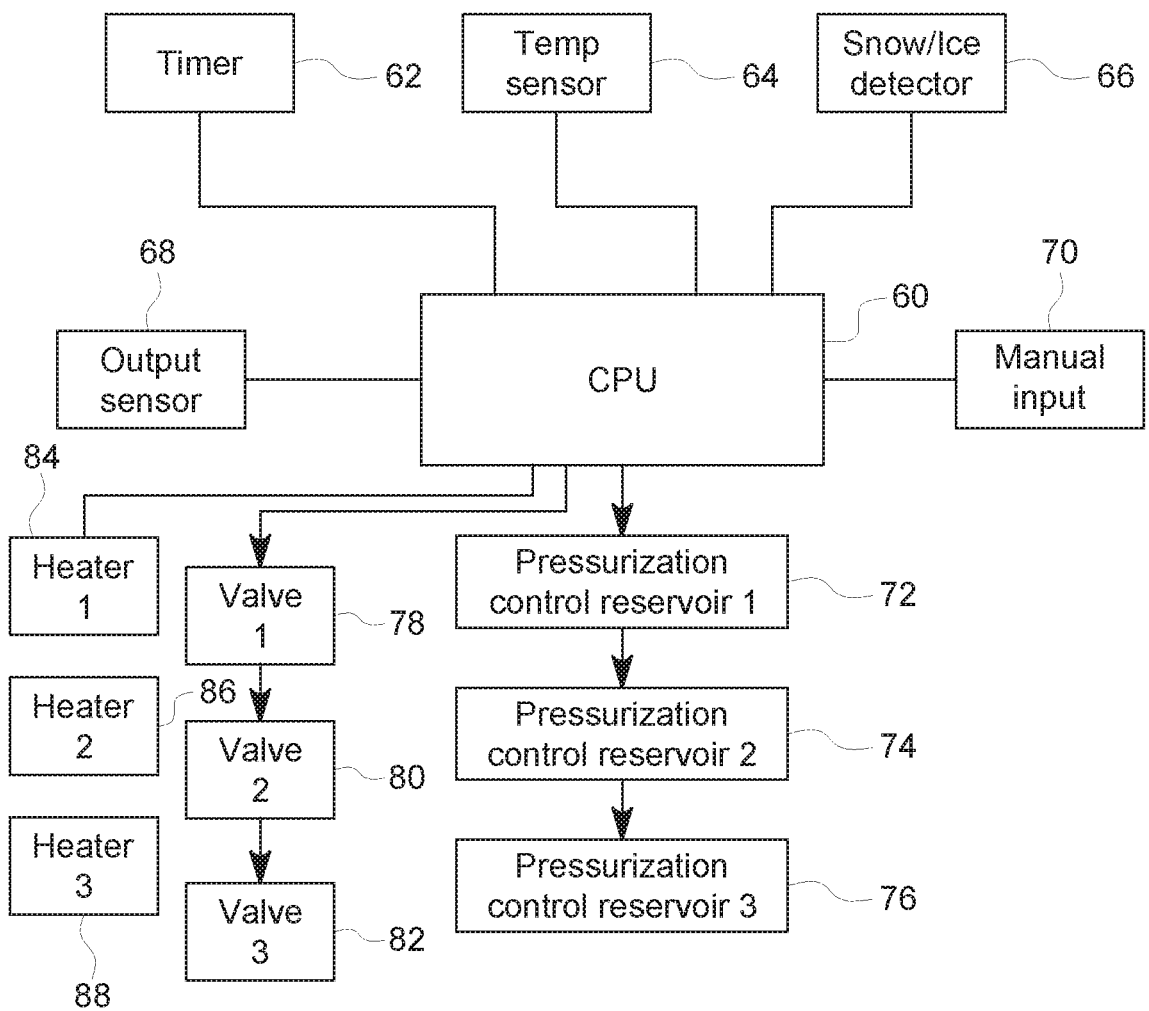
FIG. 3 is a system block diagram illustrating the control system and sensors used in accordance with an aspect of the present invention.

FIG. 3 is a system block diagram illustrating the control system and sensors used in accordance with an aspect of the present invention. A conventional computer-based control system 60 may have inputs as follows: Timer/clock 62, temperature sensor 64, snow/ice accumulation detector 66, solar energy output sensor 68 (which may be provided by another system monitoring the output of the solar panels), and manual input 70 (provided to allow an operator to command a cleaning cycle manually regardless of sensor state). In this version three separate pressurizable reservoirs 72, 74 and 76, corresponding valves 78, 80 and 82, and corresponding fluid heaters 84, 86 and 88 are provided and controlled by control system 60. Control system 60 monitors the sensors in addition to optional weather data provided electronically and operates the cleaning system accordingly. For example, prior to an ice storm it could be programmed to deploy EG to reduce the accumulation of ice on the panels and make a subsequent cleaning cycle easier. Where the weather conditions are dry but a drop in output is detected it could be programmed to deploy high pressure gas to blow dust from the panel surface, and the like.

Figures 4, 5:
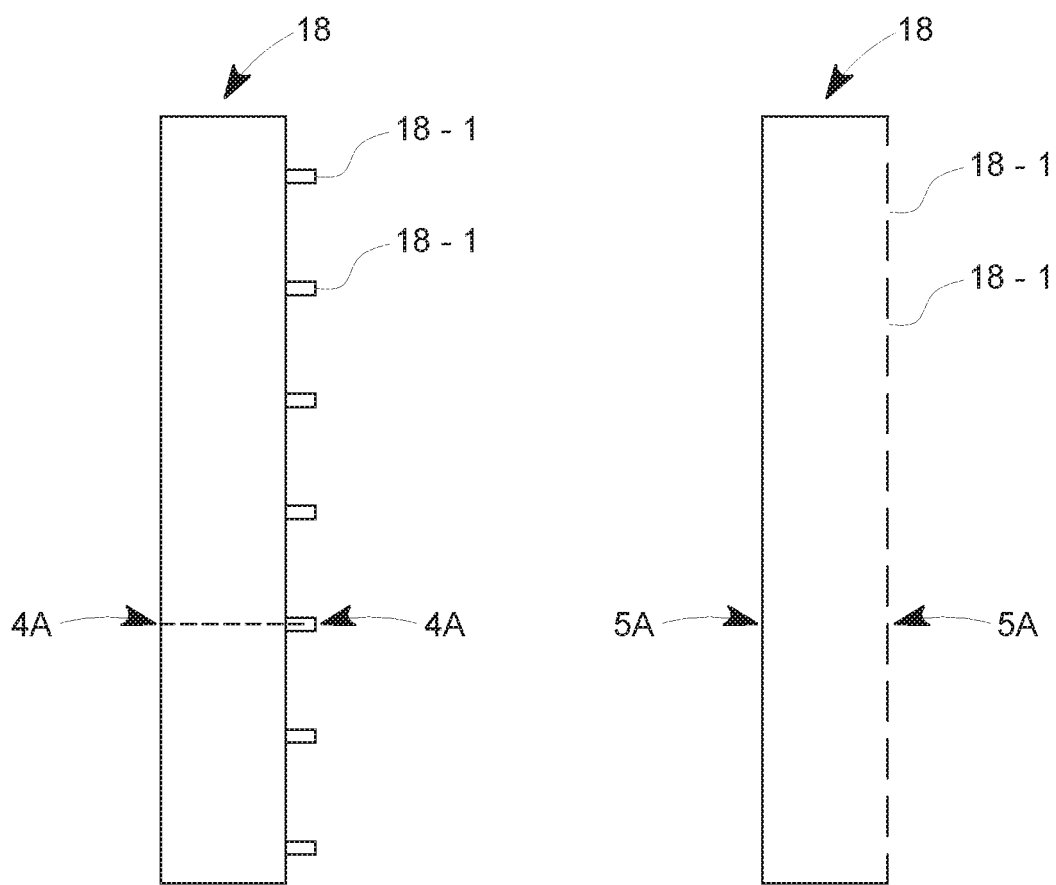
FIG. 4 is a top plan view of a fluid manifold assembly in accordance with an aspect of the present invention.
FIG. 5 is a top plan view of a fluid manifold assembly in accordance with an aspect of the present invention.
Figure 4A:
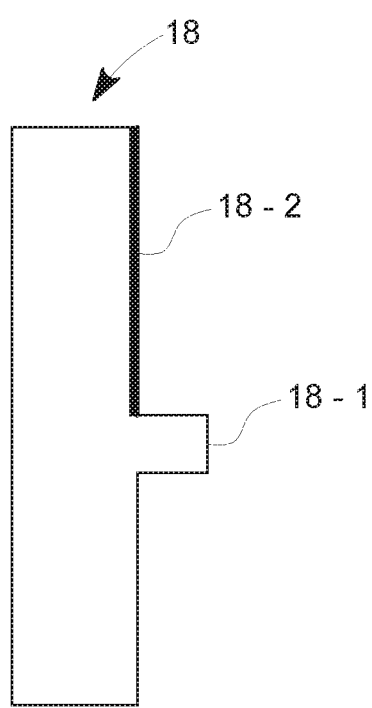
FIG. 4A is a cross-section taken along lines 4A-4A of FIG. 4 illustrating in detail an aspect of the present invention.
Figure 5A:
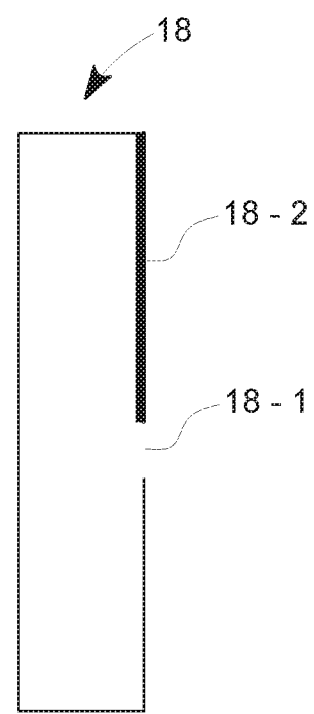
FIG. 5A is a cross-section taken along lines 5A-5A of FIG. 5 illustrating in detail an aspect of the present invention.

Turning now to FIGS. 4 and 5, FIGS. 4 and 5 illustrate a top plan view of versions of a fluid manifold assembly 18 in accordance with various aspects of the present invention. FIGS. 4A and 5A respectively illustrate cross-sections taken along lines 4A-4A of FIGS. 4 and 5A-5A of FIG. 5 illustrating in detail further aspects of the present invention.

In accordance with one example embodiment the hardware component may include a manifold plate or a plurality of tubes or conduits (typically 2-6) encased in a weatherproof case (collectively referenced by '18') running along an edge of the solar panel. These tubes will have openings for nozzles (18-1), which are placed, at periodic distances across the edge of the panel. The manifold plate may include tubes or conduits for air and liquid delivery, nozzles for delivering pressurized gas to the panel, porous plates (18-2) for gas delivery and may include one or more sensors for detecting debris or snow levels. Such sensors, if desired, may alternatively be deployed in other locations. The manifold, tubes, porous plates and nozzles are used to dispense fluid via one or more channels or paths. Fluids may comprise compressed gas (e.g., compressed air, compressed Nitrogen) with an option for heating, chemicals or water mixed with a chemical such as EG or another alcohol used to clean debris/precipitation from the panel, water used for general purpose periodic cleaning. The heaters may be incorporated into the respective reservoirs or separate, as desired.

A diffuser plate 18-2 having a matrix of pores (which may be of similar size or different sized) may be used to create a flow of pressurized gas over the surface of the panel. It may be fabricated with a metal, composite, ceramic-composite or other appropriate material. Pressurized air from the diffuser may be formed into a "curtain" of gas which assists in removing debris from the panel. It may be used in conjunction with nozzles 18-1 for deploying liquid, or instead of nozzles.

Optionally spent liquid fluid may be collected for disposal or recycling. A collector such as a trough or gutter may be deployed at the lower end of the panel to collect spent liquid. The liquid may then be directed toward a disposal system or toward filtration and recycling equipment to clean the fluid and return it to the appropriate reservoir. The process may also be controlled by control system 60.

Finally, in terms of determining the efficacy of the cleaning process, diagnostic hardware which includes LED sources and LED detection photodetectors to determine if the panel surfaces are clear or not may also be deployed under control of the control system 60. This may be accomplished by measuring the magnitude of the signal from LED sources that would arrive unattenuated if there was no debris on the surface of the panel. By placing multiple LEDs and sensors (these can be arranged vertically if need be), it would be possible for example to know how much snow was present and how much is still remaining after cleaning. An onboard camera anchored to the hardware could also be positioned at key locations to qualitatively survey the extent of the clean. The laser system described above might also be used.

Where heavy snow/ice accumulation is an issue a load cell or similar device could be used to detect snow/ice accumulation and determine when it had been abated by the cleaning process.

In accordance with another embodiment, for areas where the predominant concern is snow and/or ice buildup, a fluid dispenser may be implemented as follows. One or more extended or extendable fluid dispensers may be mounted to the solar panel. An extended dispenser would simply extend above the plane of the panel in a fixed manner. An extendable dispenser would operate under electronic, mechanical or hydraulic control to extend upon demand above the plane of the panel (for example, forcing pressurized water through it could cause it to extend if the nozzle were limited in size—much like a pop-up garden sprinkler). From the extended position the dispenser would release optionally heated fluid for cleaning the panel and the nozzle would not remain imbedded in the accumulated snow or ice facilitating snow/ice removal. A pop-up type dispenser would be configured to retract when not needed. Additionally a transducer may be attached to the panel to help shake snow/ice from the panel in conjunction with the application of fluid.

Figure 7:
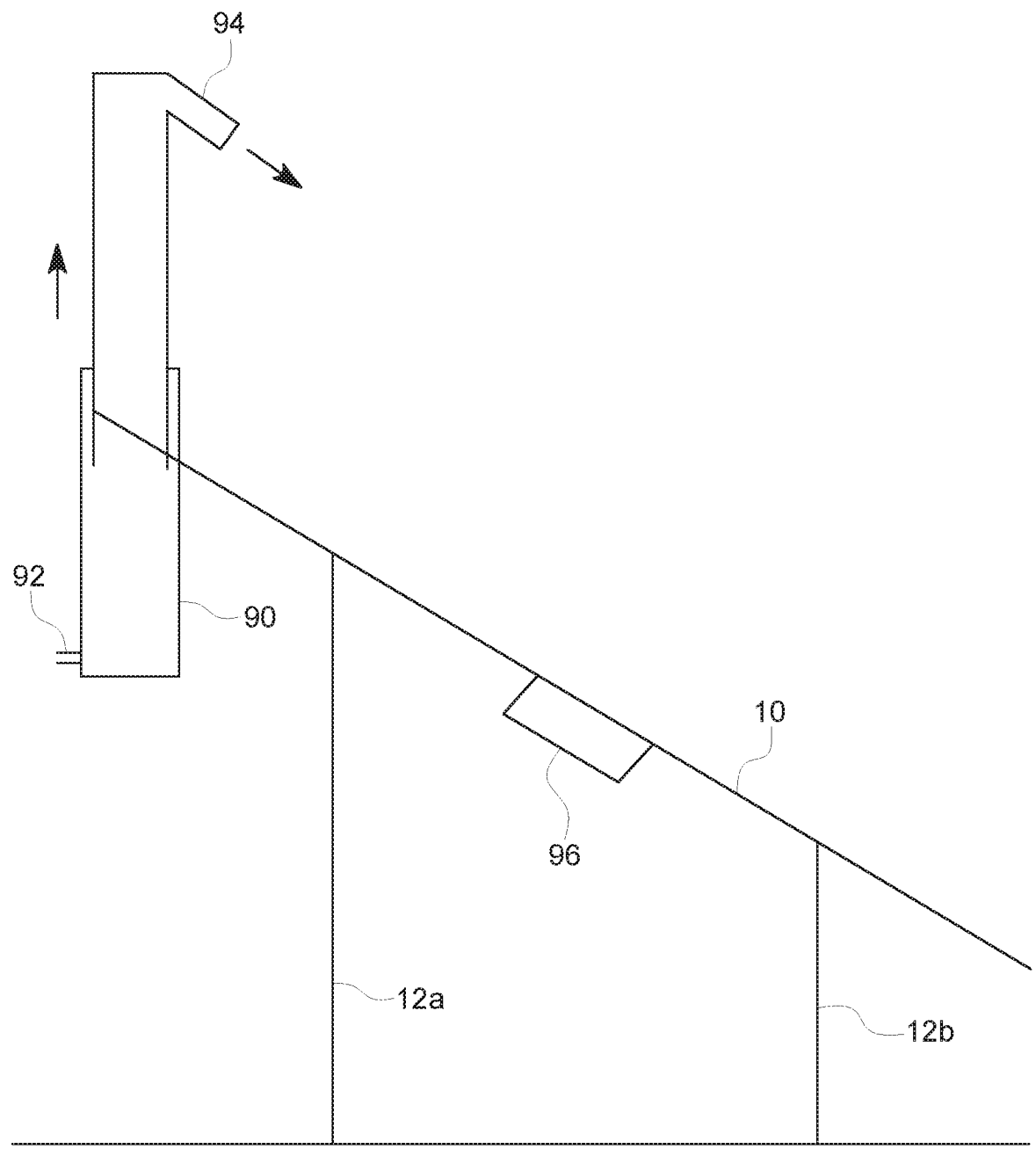
FIG. 7 is a schematic diagram of a solar panel in accordance with an aspect of the invention illustrating various embodiments incorporating extendable fluid dispensers and transducers.

Turning in more detail to FIGS. 6A, 6B and 7, FIG. 6A illustrates an extendable (pop-up) type of fluid dispenser 90 in a retracted state. Pressurized and optionally heated fluid such as water enters dispenser 90 at input 92 and exits at nozzle 94 from which it is dispensed toward the surface of the panel (10 in FIG. 7). By limiting the size of nozzle 94 and applying adequate pressure to the fluid at input 92 dispenser 90 may be forced to expand so that nozzle 94 moves upward relative to the plane of the panel (as shown in FIG. 6B) penetrating any accumulated snow/ice so that fluid exiting nozzle 94 may descend to help remove the accumulated snow/ice on the panel.

In one embodiment the fluid may substantially comprise water heated to a temperature in excess of 80 degrees centigrade. In another embodiment the fluid may substantially comprise water heated within a range of 80-99 degrees centigrade. In another embodiment the water may be electrically heated at the nozzle outlet as shown in FIG. 6C by a coil-type electrical water heater 95 to a temperature in excess of 80 degrees centigrade without concern for reaching a boiling point within the system itself.

In one embodiment various forms of transducers may be added and mechanically coupled to the panel in various ways to induce shaking of the panel which, in conjunction with the application of fluid will enhance and speed up the snow/ice removal process. For example a transducer 96 may be applied to the back of the panel, a transducer may be applied to the side of the panel, a transducer, such as a piezoelectric transducer, may be imbedded within or to the glass upper surface of the panel. In each case the transducer would be controlled by the controller 60 or a similar device working in conjunction therewith. A simple mechanical transducer may be formed of an eccentric weight spun by an electrical motor or the like and similarly controlled by controller 60 or a similar device working in conjunction therewith.

While exemplary embodiments and applications have been shown and described, it would be apparent to those skilled in the art having the benefit of this disclosure that numerous modifications, variations and adaptations not specifically mentioned above may be made to the various exemplary embodiments described herein without departing from the scope of the invention which is defined by the appended claims.

What is claimed is:

1. A solar panel, comprising:
   a solar energy collection surface and a cleaning system comprising,
   (a) a control system;
   (b) a fluid reservoir;
   (c) a fluid dispenser disposed at a perimeter of the panel and including a nozzle for emitting a fluid, the nozzle configured to dispense the fluid over the solar energy collection surface;
   (d) a valve connected to the fluid reservoir and the control system, and configured to release the fluid to the dispenser upon command from the control system; and
   (e) a heater connected to the control system; wherein the nozzle is an electrically heated nozzle comprising the heater;
   wherein the control system controls a cleaning cycle by selective release of fluid at a controlled temperature by command to the valve and the heater.

2. The solar panel of claim 1, further comprising:
   a mechanism configured to extend the nozzle of the fluid dispenser above a plane defined by the panel while dispensing the fluid from the dispenser.

3. The solar panel of claim 1, further comprising:
   a transducer connected to the control system and configured to shake or vibrate the panel upon command from the control system.

4. The solar panel of claim 1, further comprising:
   a fluid collector disposed at a second side of the panel-opposite a first side and configured to collect at least a portion of the fluid dispensed by the dispenser;
   a filter configured to filter fluid collected at the fluid collector; and
   a path to convey fluid from the filter to the fluid reservoir.

5. The solar panel of claim 1, wherein the fluid reservoir comprises a plurality of fluid reservoirs each connected to an associated valve, and each associated valve is connected to the control system.

6. The solar panel of claim 1, wherein the fluid comprises water.

7. The control system of claim 1, wherein the fluid comprises an alcohol.

8. The solar panel of claim 1, wherein the electrically heated nozzle is a coil-type heater.

9. The solar panel of claim 1, wherein the fluid is a gas.

10. The solar panel of claim 1, wherein the heater is configured to heat the fluid to a temperature exceeding 80 degrees centigrade.

11. The solar panel of claim 1, further comprising a sensor for detecting weather conditions, the sensor providing sensor data to the control system.

12. The solar panel of claim 11, wherein the sensor for detecting weather conditions comprises one or more of a temperature sensor, a visual detector, a camera, a solar energy output sensor, a load cell, a laser, and a light emitting diode.

13. The solar panel of claim 11, wherein the control system is configured to carry out the cleaning cycle based on the sensor data.

14. The solar panel of claim 1, wherein the control system is configured to carry out the cleaning cycle based on weather conditions provided as data to the control system.

15. The solar panel of claim 1, wherein the control system comprises a timer and the control system is configured to carry out the cleaning cycle based on a time condition provided by the timer.

16. The solar panel of claim 1, wherein the control system comprises a manual input and the control system is configured to carry out the cleaning cycle based on the manual input.

17. The solar panel of claim 1, wherein the fluid reservoir is configured to store a pressurized fluid.

18. The solar panel of claim 17, wherein the fluid is a gas.

19. The solar panel of claim 17, wherein the fluid is a liquid.

20. An array of solar panels comprising two or more solar panels according to claim 1.

* * * * *